United States Patent Office 3,524,746
Patented Aug. 18, 1970

3,524,746
STABILIZED WET BABY FOOD
Vincent J. Kelly and William G. Fry, Fremont, Mich., assignors to Gerber Products Company, Fremont, Mich.
No Drawing. Filed Nov. 16, 1966, Ser. No. 594,688
Int. Cl. A23l 1/10
U.S. Cl. 99—100
9 Claims

ABSTRACT OF THE DISCLOSURE

A thickened, wet, precooked formulation, especially suitable for infant feeding, formed from an aqueous slurry of food particles including meat, vegetables or combinations thereof, and from about 5 to 40 pounds per hundred gallons of final formulation, of a modified by acetylation with a monocarboxylic acid or etherification with an alkylene oxide. The amount of modification must be sufficient to maintain uniform cold stability of the formulation during subsequent prolonged periods of low temperature storage.

---

This invention relates to starch-containing precooked wet food products having a long shelf life and, more particularly, to the preparation of thickened wet precooked baby food formulations which exhibit uniform dispersion characteristics during lengthy low-temperature storage periods.

In the preparation of nutritious wet baby food formulations containing particles of meat and vegetables, it is necessary to incorporate a thickening agent such as starch to obtain a product attractive to the consumer. However, under the conditions normally present in this type of formulation, and as further intensified during prolonged periods of storage at low temperatures, naturally-occurring (unmodified) starches do not retain consistent gel characteristics.

In conventional practice, it has been found that certain starches such as a waxy maize (amioca) starch will maintain the desired cold stability in this type of wet formulation, provided that the amylopectin molecules in the starch are modified by cross-linking and acylating prior to introduction into the wet formulation; see for example, U.S. Pat. 2,935,510, issued May 3, 1960, where this "root-type" starch is modified by a combined reaction with a polyfunctional etherification or esterification reagent and a monofunctional esterification reagent. Waxy maize starch which has been treated in this manner has been combined with the aforementioned wet formulations to produce a ready-to-eat baby food which retains satisfactory cold stability for periods of at least about three years. However, waxy maize starch in its native form is considerably more expensive than other types of naturally-occurring grain starches. In addition, the waxy maize starches which are grown in the United States are not domestically available in certain foreign countries which prohibit or restrict the importation of non-domestic starches.

Naturally-occurring non-waxy grain starches such as corn, wheat, sorghum, rice and the like are not employed for the preparation of baby food formulations containing meat and/or vegetable particles as a portion of their composition is amylose molecules which suffer from linear association during prolonged storage especially at low temperatures. This linear association causes syneresis, i.e., a squeezing out of water, when the starch gel is subjected to the aforementioned storage conditions in combination with meat and/or vegetable particles. Thus, employing unmodified non-waxy grain starch to thicken the wet formulation results in a product having non-uniform dispersion characteristics and a generally unattractive appearance.

It has now been found that non-waxy grain starches which have been modified by at least partial acylation or etherification can be incorporated with wet formulations of meat and/or vegetables to obtain ready-to-eat baby food formulations which have excellent cold stability over prolonged periods. In fact, when an acylated or etherified grain starch, ordinarily in its non-peptized form, is incorporated with conventional baby food formulations prior to cooking, the resulting precooked product has been found to have rheological characteristics at least as beneficial as those present in a product prepared through the use of the more expensive modified waxy maize starch. Most surprisingly, when an acetylated or hydroxypropyl etherified non-waxy grain starch is employed, the product of this invention has been found to be significantly superior in prolonged cold stability to wet baby food formulations prepared with modified waxy maize starch.

The acylation of non-waxy grain starches such as the naturally-occurring (unmodified) corn, sorghum, rice and wheat starches can be accomplished through reaction with any of the many well-known monocarboxylic acids which are permissible modifying agents for food products. Examples of such monocarboxylic acids which are suitable are acetic, propionic, butyric and the like, especially in their anhydride form. For purposes of illustration only, the acylation of the non-waxy grain starches will hereinafter be described with reference to U.S. Pat. 2,461,139, issued Feb. 8, 1949. In addition, the naturally-occurring non-waxy grain starches may first be modified with an alkali as directed in U.S. Pat. 2,373,016, issued Apr. 3, 1945, and then subsequently acylated in the manner as set forth in the aforementioned U.S. Pat. 2,461,139. Grain starches, modified as directed by these patents, have until now had limited food industry application in entirely unrelated products such as adult-type pie fillings and fruit flavored puddings which are only subject to storage periods of relatively insignificant duration. Therefore, it has not been apparent that the use of these acylated grain starches would result in wet baby food formulations having the necessary prolonged cold stability.

The etherification of non-waxy grain starches such as the naturally-occurring (unmodified) corn, sorghum, rice and wheat starches can be accomplished through reaction with various well-known alkylene oxides which are preferably permissible modifying agents for food products. Examples of suitable alkylene oxides include ethylene oxide, propylene oxide and the like. For purposes of illustration only, the etherification of the non-waxy grain starches with an alkylene oxide will hereinafter be described with reference to U.S. Pat. 2,516,633, issued July 25, 1950. U.S. Pat. 2,516,633 discloses that grain starches, modified by the process of the patent, are useful in the textile and paper industries.

U.S. Pat. 2,516,633 further suggests that halohydrins, such as epicholorhydrin, can also be employed to produce etherified grain starches which are suitable for the textile and paper industries. However, when non-waxy grain starches were modified with epichlorohydrin, for example, utilizing the process of U.S. Pat. 2,516,633, the resulting etherified grain starch was found to be unsatisfactory for use in the type of baby food formulations to which this application is directed.

Although it is not intended for the invention to be limited to any specific theoretical concept, it appears that the amylose molecules in the aforementioned baby food formulation form hydrogen bonds with themselves. This undesirable hydrogen bond formation results in an alignment and attachment of the amylose molecules and cause the aforementioned syneresis which reduces the volume of the starch-containing paste and, consequently, squeezes water out of the gelatinized formulation with the result that the product becomes non-uniform and unattractive for consumer distribution.

However, when non-waxy grain-type starches are acylated, for example, with acetic acid in the form of acetic anhydride, with the aforementioned alkali treatment and then with the acetic anhyride or with an alkylene oxide such as propylene oxide, chemical groups apparently attach themselves along the length of each amylose molecule and sterically inhibit hydrogen bond formation. Therefore, the undesirable hydrogen bond formation between amylose molecules is prevented and syneresis of the wet baby food formulation is minimized even during prolonged storage at subroom temperature such as at about 40° F.

When acylating a non-waxy grain starch, such as corn starch, by the process as described in U.S. Pat. No. 2,461,139, the following procedure was employed: Unmodified corn starch (162 grams dry basis) in an ungelatinized form, was weighed into about 220 ml. of distilled water, at about 25° C. in a 400 ml. Griffen beaker. The mixture was stirred until a uniform slurry of starch in water resulted. The slurry was then placed under moderate mechanical agitation using an electric motor and stirrer. Glass and calomel electrodes of a laboratory model pH meter were inserted into the starch suspension. The pH was carefully adjusted to 8.0 by adding 3% sodium hydroxide solution dropwise to the suspension while keeping it under agitation. A more concentrated caustic solution was found to peptize the starch granule.

About 3% of acetic anhydride by dry weight of starch was slowly added dropwise to the agitating starch suspension, while 3% sodium hydroxide solution was simultaneously added at a rate sufficient to maintain the pH of the suspension of 8.0-8.4. Delicate control of pH was found to be vital. When all the acetic anhydride had been added, the pH was adjusted to 4.5 with .5 N hydrochloric acid, then the slurry was filtered on a Buchner funnel containing Whatman No. 4 filter paper. The filter cake was reslurried in 150 ml. of water and refiltered. The slurrying and filtering were repeated once more, and the resulting filter cake was air dried to equilibrium moisture content. Reaction efficiency in the order to 70% was obtained.

It will be apparent to one skilled in this art that the naturally-occurring non-waxy grain starches do not have to be completely acylated to produce the required steric hindrance. For example, non-waxy corn starch, acylated as previously illustrated by the process of U.S. Pat. 2,461,139, supra, with 0.1 mole acetic anhydride/mole of anhydro-D-glucose unit appears to give a degree of substitution of about 0.07 mole of acetyl/mole of glucose unit. This amount of acylation has been found to produce a modified starch which is advantageous in the aforementioned formulations. Of course, more extensive acylation of the grain starch may be accomplished where the subsequent storage conditions of the formulation will be particularly prolonged and/or cold.

In the alternative modification which has also been found to be advantageous, the initial treatment of the naturally-occurring non-waxy corn or wheat starch involves the procedure outlined in U.S. Pat. 2,373,016. Thereafter, further treatment with the process set forth in the aforementioned U.S. Pat. 2,416,139 is carried out. The following is representative of this alternate procedure:

Unmodified corn starch (324 grams dry basis) was slurried in 440 ml. of water at 100° F. for six hours. Then the starch was allowed to settle overnight. It was then centrifuged at 1500 r.p.m.'s for fifteen minutes. The yellow gluten layer was washed off with water and the resulting starch was re-suspended in distilled water and brought to pH. 5.5 with .5 N hydrochloric acid, suction filtered and dried. The starch was then subjected to the acetylation as outlined supra.

When etherifying a non-waxy starch such as corn starch by the process as generally described in U.S. Pat. 2,516,633 the following procedure was employed:

Unmodified corn starch (400 grams dry basis) in an ungelatinized form, was suspended in about 600 grams of water at about 38° C. A mixture of 20 grams of a 30% sodium hydroxide solution and 140 grams of a 26% sodium chloride solution were slowly added with vigorous stirring to the starch suspension. 20 grams of propylene oxide were stirred into the resulting suspension. The suspension was then reacted, with sufficient agitation to prevent settling, in a closed vessel for 48 hours while maintaining the temperature at 38° C. The suspension was then neutralized to pH 5.0 with dilute hydrochloric acid, dewatered on a suction filter, and washed with water at 38° C. The resulting filtered product was resuspended, again dewatered and washed until the filtrate was free of sodium chloride. The starch filter cake was crumbled and dried at room temperature to about a 9–11% moisture content.

Here again, it will be apparent to one skilled in this art that the naturally-occurring non-waxy grain starches do not have to be completely etherified to produce the required amount of steric hindrance. The amount of etherification which was produced by the aforementioned procedure has been found to produce a modified starch which was especially advantageous in the aforementioned baby food formulations. However, more extensive etherification of the grain starches may be accomplished where the subsequent storage conditions of the formulation will be particularly prolonged and/or cold.

The wet precooked baby food formulation of this invention can be prepared by any of the methods well-known to those of skill in this art. For example, the formulation can be prepared by forming a slurry of the various sliced and ground meat particles, forming another slurry of strained vegetables and a further slurry of dry ingredients such as the modified grain starch, flour and seasoning. The slurries are then combined and the volume adjusted with water. The formulation is heated to gelatinize the starch and "commercially sterilize" the ingredients to obtain the desired reduction in bacteria count.

The amount of acylated or etherified grain starch necessary to obtain a suitable consumer product of this type is consistent with the prior art use of modified waxy maize starch and is governed by the appearance desired as well as other practical considerations such as the particular vegetables and/or meat particles which are being combined. However, for purposes of illustration, acylated or etherified starch in amounts from as little as about 5 to about 40 pounds per 100 gallons of final formulation can be employed, with about 20 pounds of the modified grain starch per 100 gallons having been found to produce an especially attractive product.

Illustrative of the types of vegetables and meat particles which are suitable in formulations prepared as set forth herein are carrots, corn, peas, tomatoes, split green peas, beans, veal, poultry, lamb, beef and pork. It will be obvious to one skilled in this art that many other vegetables and meat particles may be employed under similar process conditions. Again, the amount of the individual meat and vegetable ingredients included in the formulation will depend on the particular end product desired. However, as a practical matter, from 60—90% by weight of the components, other than water, should be meat and/or vegetables. This will usually amount to from about 150-225 pounds of meat and/or vegetables per 100 gallons of formulation.

Various types of flour, such as potato, wheat and the like, are also employed as desired in conventional quantities such as 10-30 pounds per 100 gallons of formulation. Salt and other seasonings may also be incorporated in conventional amounts for their obvious advantages.

To further illustrate the invention, the following example is provided. Split green peas were included in the formulation because they are found to produce the most severely adverse conditions for retaining satisfactory cold stability over prolonged storage periods. It should be understood that the particular details of the example are not to be regarded as limitations as they may be varied as will be understood by one skilled in this art.

A strained meat-vegetable formulation was prepared in the following proportions:

| Ingredient: | Pounds [2] |
|---|---|
| Carrots | 80 |
| Lamb, boneless | 60 |
| Tomato puree | 40 |
| Acetylated corn starch [1] | 20 |
| Baked wheat flour | 15 |
| Peas, split green | 10 |
| Potato flour | 10 |
| Seasoning, etc. | 10 |
|  | 245 |

[1] Acetylated according to process set forth in U.S. Pat. 2,461,139, supra.
[2] Pounds of solids per 100 gallons of formulation at 200° F.

The lamb was passed through a Rietz extruder and an Autio grinder having 3/16" plates. The meat was then slurried with hot water and the potato flour and split peas added thereto and the combined slurry pumped to a cone tank. The carrots were passed through a Robinson cutter and also collected in the cone tank. The mixture was adjusted to 10 gallons and precooked for five minutes at about 210° F.

The other dry ingredients, including tomato puree, were slurried with 15 gallons of cold water and passed through a finisher, then combined with the meat-vegetable slurry. Water was added at about 200° F. to adjust the volume to 100 gallons and the formulation was pumped into small glass containers and capped. The capped glass containers were then heated to about 250° F. (internal temperature: 160° F.) for about 40 minutes to insure adequate sterilization.

Similar packs of strained vegetables and lamb were prepared employing modified waxy maize starch; unmodified corn starch; corn starch acetylated both by the process of U.S. Pat. 2,461,139 and the combined process of U.S. Pats. 2,373,016 and 2,461,139; and corn and wheat starch each etherified with propylene oxide by the process of U.S. Pat. 2,516,633. The packs were placed in storage at 40° F., and samples of each were tested after eight weeks storage. The formulations were graded according to consistency, sheen and degree of water separation. The formulations prepared with both of the non-peptized acetylated corn starches and the non-peptized etherified corn and wheat starch were found to be at least equal to those prepared with the modified waxy maize starch. The formulation prepared with unmodified corn starch was unsatisfactory.

In further tests conducted after sixteen weeks of storage at 40° F., the amount of free water in the samples was measured. The amount of free water is a measure of the stability of the formulation, i.e., the free water increases as cold stability decreases.

The results obtained were as follows:

| Starch: | Free water, ml./oz. |
|---|---|
| Modified waxy maize | 9.9/4½ |
| Unmodified corn | 12.2/4½ |
| Acetylated corn [1] | 0.7/4½ |
| Hydroxypropyl etherified corn [2] | 0.0/4½ |
| Hydroxypropyl etherified wheat [2] | 0.0/4½ |

[1] Acetylated according to process set forth in U.S. Pat. 2,461,139, supra.
[2] Hydroxypropyl etherified according to process set forth in U.S. Pat. 2,516,633, supra.

These sixteen week tests illustrate the significant improvement in cold stability of formulations containing acetylated corn starch and hydroxypropyl etherified corn wheat starch when compared to the cold stability of a formulation including modified waxy maize starch.

Although the foregoing invention has been described in some detail by way of illustration and example for purposes of clarity of understanding, it will be obvious that certain changes and modifications may be practiced within the scope of the invention, as limited only by the scope of the appended claims.

What is claimed is:

1. A process for preparing a thickened, wet, ready-to-eat baby food from an aqueous formulation containing particles of meat and vegetables, comprising the steps of: incorporating into said aqueous formulation from about 5 to 40 pounds per 100 gallons of final formulation of a modified non-waxy grain starch selected from the group consisting of a non-waxy grain starch acylated with a mono-carboxylic acid and a non-waxy grain starch etherified with an alkylene oxide, said starch having been sufficiently modified to cause said aqueous formulation to maintain uniform cold stability characteristics during subsequent extended storage periods; filling and sealing containers with said aqueous formulation; and heating said starch-containing aqueous formulation for a period of time sufficient to commercially sterilize the formulation.

2. A process in accordance with claim 1 wherein sufficient modified grain starch is incorporated to insure uniform cold stability of the formulation during extended storage periods at a temperature of about 40° F.

3. A process in accordance with claim 1 wherein said modified grain starch is acetylated corn starch.

4. A process in accordance with claim 1 wherein said modified grain starch is hydroxypropyl etherified wheat starch.

5. A process in accordance with claim 1 wherein said formulation includes split green peas.

6. A thickened, wet, precooked aqueous slurry formulation, especially suitable for infant feeding, comprising at least one member selected from the group consisting of meats and vegetables, and from about 5 to 40 pounds per 100 gallons of formulation, of a modified non-waxy grain starch selected from the group consisting of a non-waxy grain starch acylated with a mono-carboxylic acid and non-waxy grain starch, etherified with an alkylene oxide, said starch having been sufficiently modified to maintain uniform cold stability of said formulation during subsequent prolonged periods of low-temperature storage.

7. A formulation in accordance with claim 6 wherein the amount of said modified grain starch is sufficient to maintain the uniform cold stability of said formulation during subsequent extended perods of storage at temperatures of about 40° F.

8. A formulation in accordance with claim 6 wherein said modified grain starch is acetylated corn starch.

9. A formulation in accordance with claim 6 wherein said modified grain starch is hydroxypropyl etherified wheat starch.

References Cited

UNITED STATES PATENTS

| 2,461,139 | 2/1949 | Caldwell | 260—234 |
| 3,021,222 | 3/1962 | Kerr et al. | 99—139 |
| 3,429,711 | 2/1969 | Billerbeck et al. | 99—83 |

RAYMOND N. JONES, Examiner

U.S. Cl. X.R.

99—107